United States Patent
Chennamsetty et al.

(10) Patent No.: US 9,251,154 B2
(45) Date of Patent: Feb. 2, 2016

(54) PRIORITY BASED RELIABILITY MECHANISM FOR ARCHIVED DATA

(71) Applicant: International Business Machines Corporation, Armonk, NY (US)

(72) Inventors: Ramamohan Chennamsetty, Highland, NY (US); Blaine H. Dolph, Western Springs, IL (US); Sandeep R. Patil, Vimannagar (IN); Riyazahamad M. Shiraguppi, Pune (IN); Gandhi Sivakumar, Bentleigh (AU)

(73) Assignee: International Business Machines Corporation, Armonk, NY (US)

(*) Notice: Subject to any disclaimer, the term of this patent is extended or adjusted under 35 U.S.C. 154(b) by 259 days.

(21) Appl. No.: 14/081,195

(22) Filed: Nov. 15, 2013

(65) Prior Publication Data
US 2015/0142752 A1    May 21, 2015

(51) Int. Cl.
 *G06F 17/00*    (2006.01)
 *G06F 17/30*    (2006.01)

(52) U.S. Cl.
 CPC .............. *G06F 17/30073* (2013.01)

(58) Field of Classification Search
 CPC .................................. G06F 17/30073
 USPC ......................................... 707/665
 See application file for complete search history.

(56) References Cited

U.S. PATENT DOCUMENTS

| | | | | |
|---|---|---|---|---|
| 7,593,532 B2* | 9/2009 | Plotkin | ............... | H04L 9/0894 380/284 |
| 2011/0307451 A1* | 12/2011 | El Haddi | ............. | G06F 17/3012 707/673 |

FOREIGN PATENT DOCUMENTS

| | | |
|---|---|---|
| EP | 1909468 | 1/2010 |
| WO | 2009048727 | 4/2009 |
| WO | 2012147087 | 11/2012 |

OTHER PUBLICATIONS

Gray, Jim, et al., "Parity Striping of Disc Arrays: Low-Cost Reliable Storage with Acceptable Throughput", Proc. of the 16th VLDB Conf., Brisbane, Australia, © 1990, pp. 148-161.*
Storer, Mark W., et al., "POTSHARDS: Secure Long-Term Storage Without Encryption", Proc. of the USENIX Technical Conf., Santa Clara, CA, Jun. 17-22, 2007, pp. 143-156.*
Wu, Liang Tai; Models for Evaluating the Performability of Degradable Computing Systems; IP.com; IPCOM000151633D; Original Publication Date Jun. 30, 1982; IP.com Electronic Publication Date Apr. 23, 2007; 401 pages.

* cited by examiner

*Primary Examiner* — Robert Stevens
(74) *Attorney, Agent, or Firm* — Schmeiser, Olsen & Watts; Matthew Chung

(57) ABSTRACT

A method and system for determining priority is provided. The method includes generating a list defining specified data objects stored within a back-up/archived data storage system and applying importance levels to the specified data objects. Reliability urgency levels for the storage devices are determined and in response groups of data objects of the specified data objects are generated. Required reliability levels for each group of data objects are determined and associated erasure encoding rates are calculated. Fragment sets for the groups of data objects are generated and numbers of parity objects required for the fragment sets are determined. An erasure code algorithm is executed with respect to the groups of data objects and in response parity objects are computed on demand.

20 Claims, 5 Drawing Sheets

PRIORITY BASED RELIABILITY MECHANISM FOR ARCHIVED DATA

FIELD

The present invention relates generally to a method for improving reliability for stored data, and in particular to a method and associated system for implementing a priority based mechanism for improving reliability for archived data.

BACKGROUND

Determining data storage typically includes an inaccurate process with little flexibility. Evaluating data storage order may include a complicated process that may be time consuming and require a large amount of resources. Accordingly, there exists a need in the art to overcome at least some of the deficiencies and limitations described herein above.

SUMMARY

A first aspect of the invention provides a priority based method comprising: generating, by a computer processor of a computing system based on user defined data, a list defining specified data objects of multiple data objects stored within a back-up/archived data storage system; applying, by the computer processor, importance levels to the specified data objects; determining, by the computer processor based on determined health factors for storage devices storing the specified data objects, reliability urgency levels for the storage devices; generating, by the computer processor based on the importance levels and determined health factors, groups of data objects of the specified data objects; determining, by the computer processor based on the importance levels, required reliability levels for each group of the groups of data objects; calculating, by the computer processor based on the importance levels, erasure encoding rates for the groups of data objects; generating, by the computer processor, fragment sets for the groups of data objects; determining, by the computer processor based on the erasure encoding rates and a size of each the fragment set, numbers of parity objects required for the fragment sets; executing, by the computer processor, an erasure code algorithm with respect to the groups of data objects; and computing on demand, by the computer processor based on results of the executing, parity objects of the groups of data objects.

A second aspect of the invention provides a computing system comprising a computer processor coupled to a computer-readable memory unit, the memory unit comprising instructions that when executed by the computer processor implements a method comprising: generating, by the computer processor based on user defined data, a list defining specified data objects of multiple data objects stored within a back-up/archived data storage system; applying, by the computer processor, importance levels to the specified data objects; determining, by the computer processor based on determined health factors for storage devices storing the specified data objects, reliability urgency levels for the storage devices; generating, by the computer processor based on the importance levels and determined health factors, groups of data objects of the specified data objects; determining, by the computer processor based on the importance levels, required reliability levels for each group of the groups of data objects; calculating, by the computer processor based on the importance levels, erasure encoding rates for the groups of data objects; generating, by the computer processor, fragment sets for the groups of data objects; determining, by the computer processor based on the erasure encoding rates and a size of each the fragment set, numbers of parity objects required for the fragment sets; executing, by the computer processor, an erasure code algorithm with respect to the groups of data objects; and computing on demand, by the computer processor based on results of the executing, parity objects of the groups of data objects.

A third aspect of the invention provides a computer program product for prioritization, the computer program product comprising: one or more computer-readable, tangible storage devices; program instructions, stored on at least one of the one or more storage devices, to generate based on user defined data, a list defining specified data objects of multiple data objects stored within a back-up/archived data storage system; program instructions, stored on at least one of the one or more storage devices, to apply importance levels to the specified data objects; program instructions, stored on at least one of the one or more storage devices, to determine based on determined health factors for storage devices storing the specified data objects, reliability urgency levels for the storage devices; program instructions, stored on at least one of the one or more storage devices, to generate based on the importance levels and determined health factors, groups of data objects of the specified data objects; program instructions, stored on at least one of the one or more storage devices, to determine based on the importance levels, required reliability levels for each group of the groups of data objects; program instructions, stored on at least one of the one or more storage devices, to calculate based on the importance levels, erasure encoding rates for the groups of data objects; program instructions, stored on at least one of the one or more storage devices, to generate fragment sets for the groups of data objects; program instructions, stored on at least one of the one or more storage devices, to determine based on the erasure encoding rates and a size of each the fragment set, numbers of parity objects required for the fragment sets; program instructions, stored on at least one of the one or more storage devices, to execute an erasure code algorithm with respect to the groups of data objects; and program instructions, stored on at least one of the one or more storage devices, to compute on demand based on results of executing the erasure code algorithm, parity objects of the groups of data objects.

The present invention advantageously provides a simple method and associated system capable of determining data storage.

DETAILED DESCRIPTION

Figure 1:
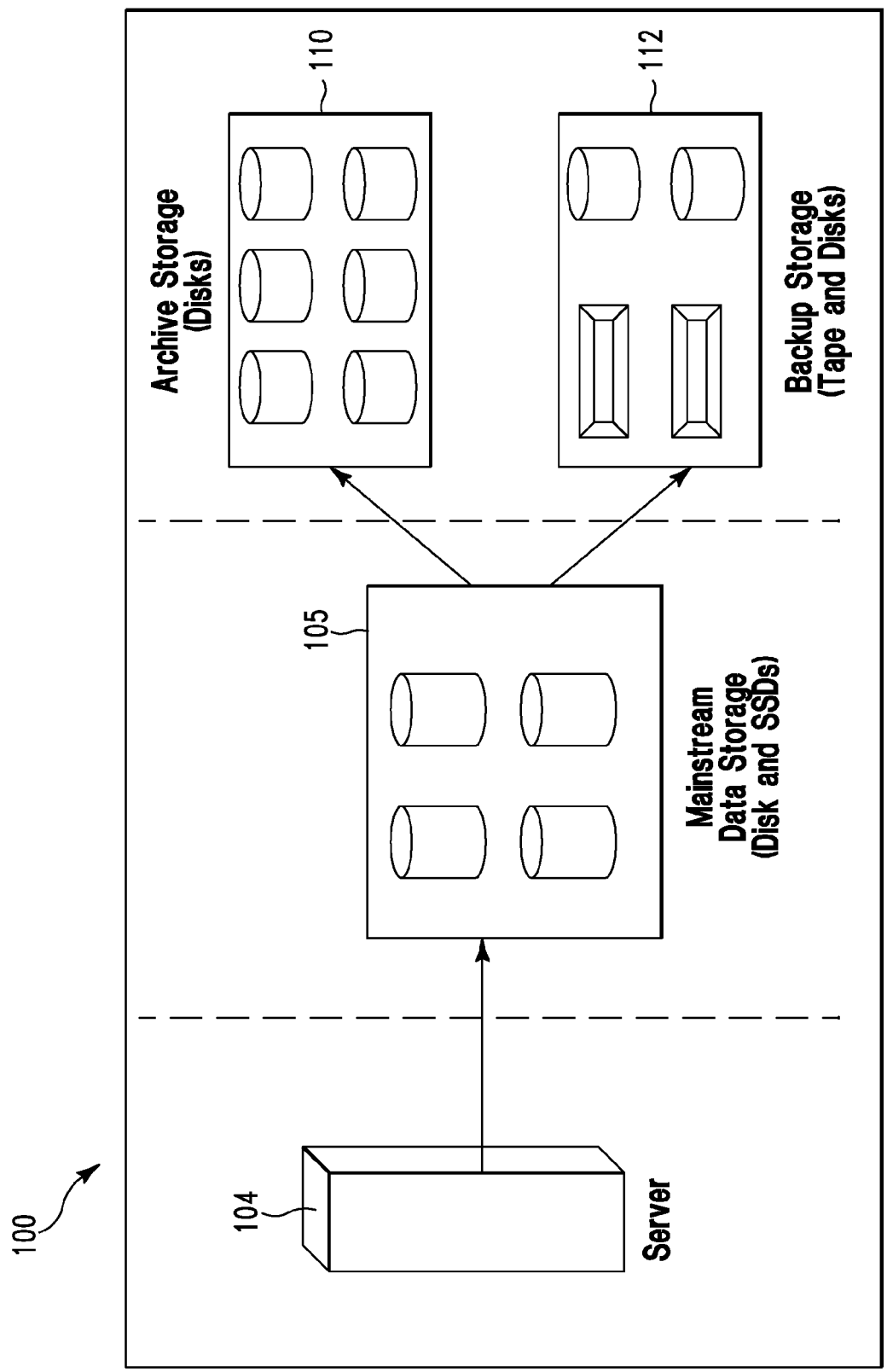
FIG. 1 illustrates a system for providing a means for improving reliability for stored data, in accordance with embodiments of the present invention

FIG. 1 illustrates a system 100 for providing a means for improving reliability for stored data, in accordance with embodiments of the present invention. The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or any type of programming languages such as, inter alia, an assembly language. The program code can execute entirely on the user's device, partly on the user's device, as a standalone software package, partly on the user's device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 100 of FIG. 1 includes a server 104 connected to a mainstream data storage system 105, an archive storage system 110, and a backup storage system 112. Server 104 supplies data to mainstream data storage system 105 for storage of the data. Archive storage system 110 and backup storage 112 system provide a data archiving process for the data. Data archiving comprises a process for selectively moving data that is not currently being used to a separate data storage device for long-term retention. Data archives comprise, inter alia, necessary data, data that must be retained for regulatory compliance, etc. Data archives may be indexed and may comprise functions enabling a process for locating files for retrieval. Data backups may used to, inter alia, restore corrupted and/or destroyed data, recover data from an earlier time according to a user-defined data retention policy, etc.

Figure 2:
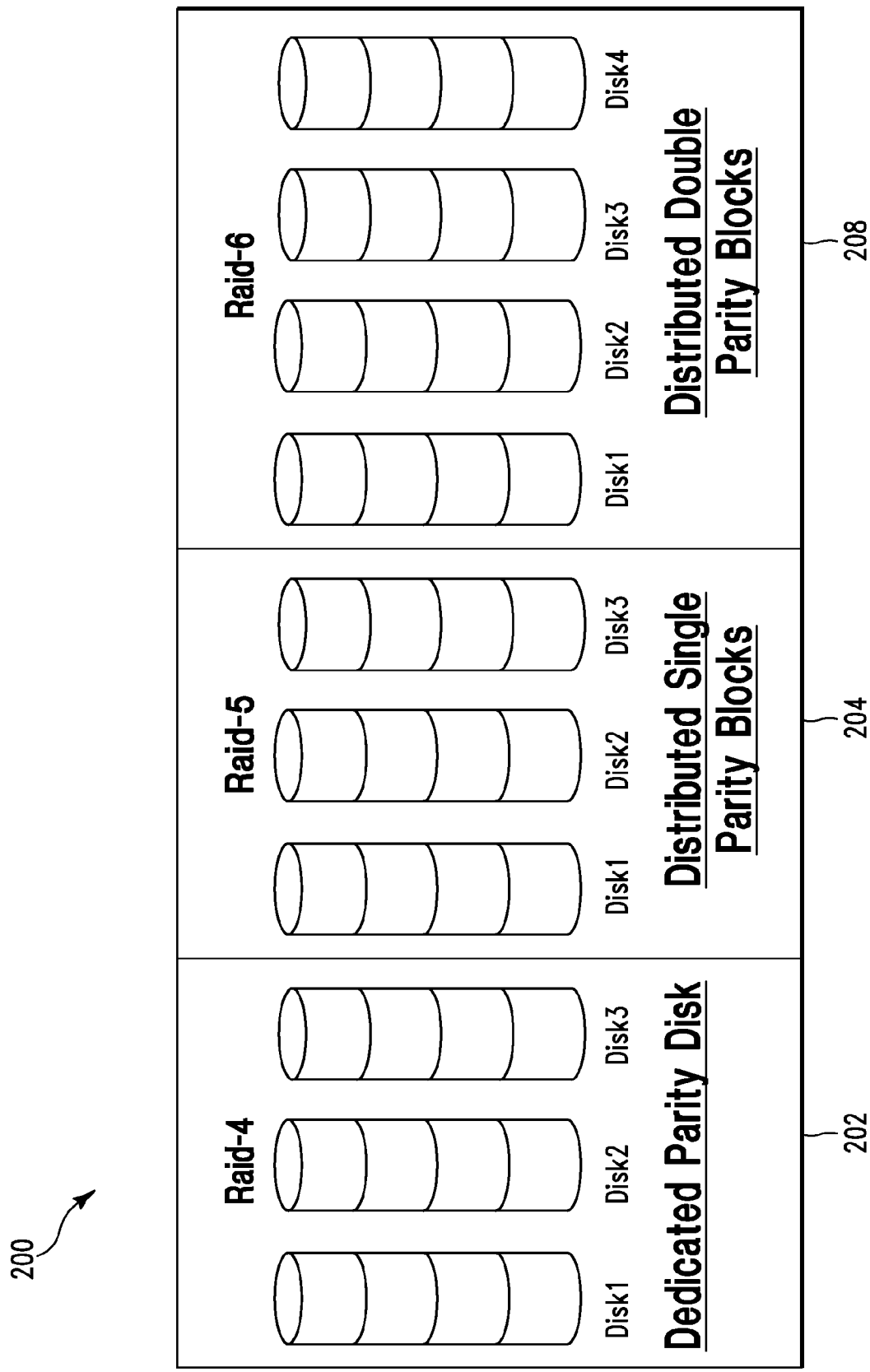
FIG. 2 illustrates a disk storage system for providing a means for improving reliability for stored data, in accordance with embodiments of the present invention.

FIG. 2 illustrates a disk storage system 200 for providing a means for improving reliability for stored data, in accordance with embodiments of the present invention. Disk storage system 200 comprises a dedicated parity disk 202, distributed single parity blocks 204, and distributed double parity blocks 208. Disk storage system 200 enables a process for implementing a redundant array of independent disks (RAID) system and calculation of an erasure code.

The process for implementing a RAID system comprises combining multiple small, inexpensive disk drives into an array of disk drives yielding performance exceeding that of a single large expensive drive (SLED). A RAID storage system may can RAID-4, RAID-5, or RAID-6 type schemes to achieve striping and/or parity within a group of storage disks.

An erasure code comprises a forward error correction (FEC) code (associated with a binary erasure channel) for transforming a message of k symbols into a longer message (e.g., a code word) with n symbols such that an original message may be recovered from a subset of the n symbols. An erasure code provides redundancy by dividing objects up into smaller fragments and storing the fragments in different places thereby enabling the recovery of data from any combination of a smaller number of fragments. An erasure code encoding rate r may be calculated as follows: $r=m/n$ (<1) where m comprises a number of data fragments (i.e., a number of verified fragments required to reconstruct original data) and n comprises a total number of fragments. For example, with respect to an application block size of 4K (i.e., for an application) and a disk block size of 1K, one application block may be split on 4 disk blocks in a storage pool. The split is not visible to the application. An erasure code allows any number of parity blocks for a given block. Therefore, if a storage pool comprises 10 disks and an administrator generates 2 parity blocks for each group of 4 disk blocks, there will be 2 disk blocks comprising parities. The (4+3=7) blocks will be placed on any of 7 out of 10 disks in the storage pool. Therefore, m=a number of data blocks (i.e., 4), c=a number of parity blocks (i.e., 7), and n=total blocks (i.e., m+c=7). An erasure code encoding rate equals a number of data blocks divided by a total number of blocks for given application block fragment.

Figure 3:
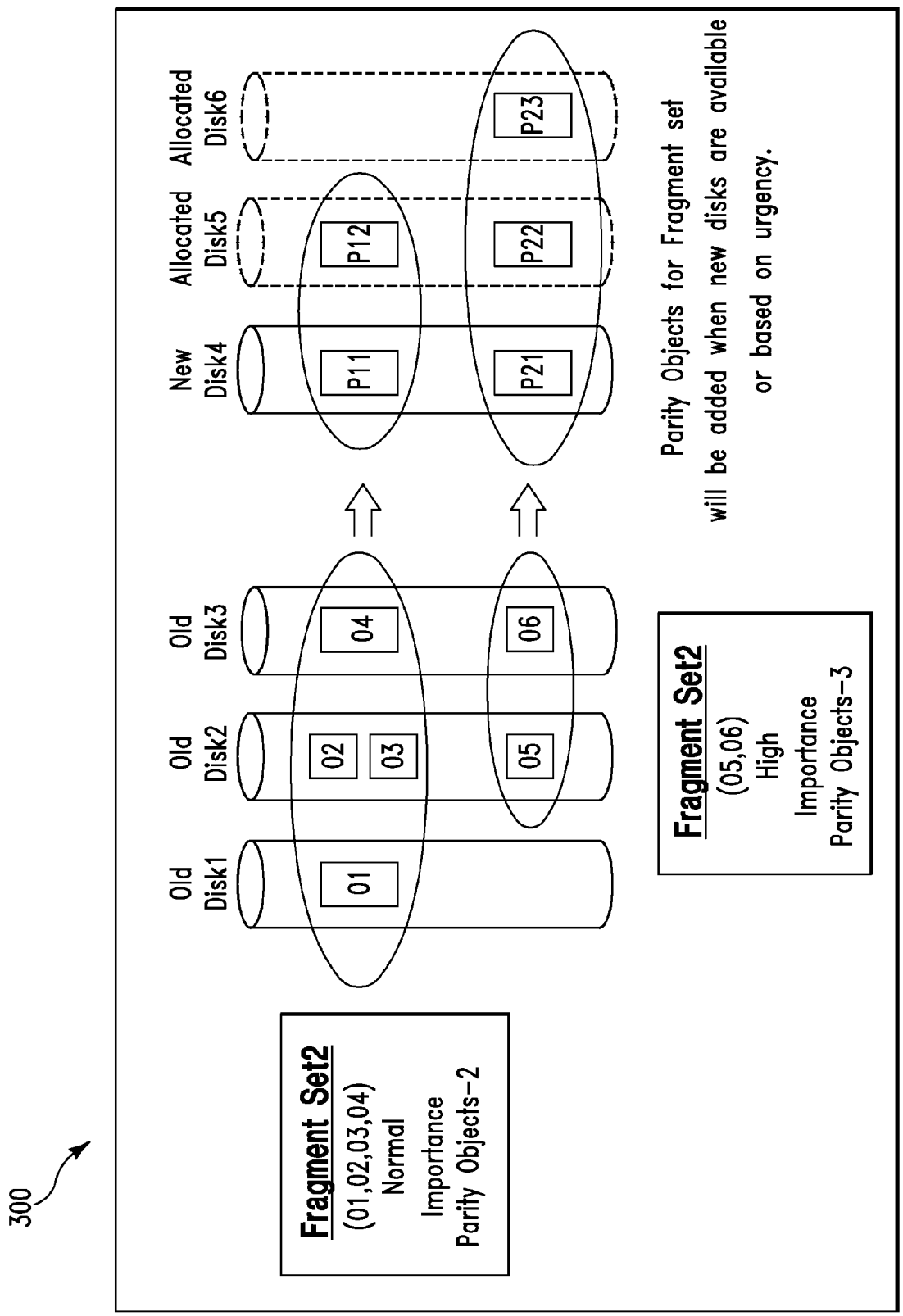
FIG. 3 illustrates a disk storage system for providing a means for improving reliability of important data already stored on a backup/archive storage system, in accordance with embodiments of the present invention.

FIG. 3 illustrates a disk storage system 300 for providing a means for improving reliability of important data already stored on a backup/archive storage system, in accordance with embodiments of the present invention. Disk storage system 300 improves a reliability of important data already stored on a backup/archive storage system such that:

1. Data objects stored within backup/archive storage from different disks with equal importance are grouped together and considered for parity calculation. A data object is defined herein as an application access entity unit (e.g., a file or portion of a file or set of application data blocks) which is stored on a backup/archival storage system.
2. A parity calculation is executed using an erasure code technique which allowing retrieval of any number of parity objects based on a reliability requirement. A number of parity objects required for given group of data objects is determined based on the importance of the data.
3. Parity objects are added to a new disk on-demand or based on an urgency considering health of the storage disks of the objects in the group.

Disk storage system 300 enables a method for providing a priority based progressive reliability improvement mechanism for already backed up/archived data. Disk storage system 300 creates a group of data objects (based on importance and risk of device failure) in backed up/archived data and generates recommendations for suggested parity levels for each data group as follows:

1. For each object group (based on the importance of the data objects) a required level of reliability may be determined. The required level of reliability is used to determine a required erasure encoding rate for the objects. A required erasure encoding rate comprises a percentage ratio comprising a number of data disk divided by a total number of disks (i.e., data+parity).
2. For each object group, a fragment Set is created where each fragment comprises a single/multiple objects belonging to a same disk. Fragments comprising an almost equal size are bunched in a fragment set such that each fragment in a fragment set belongs to a different disk. An erasure encoding rate of a group of objects may be assigned to a fragment set.
3. Based on a size of a fragment set and a required erasure encoding rate, a number of additional parity objects required for a given fragment is determined. A fragment set may be divided if a number of additional parity objects are determined to exceed a considerable amount.

Additionally, disk storage system 300 may implement a method for increasing a reliability of files or data objects already stored on the backup or archival storage system as well, as providing an intelligent mechanism to group different objects of equal reliability level from same/different files from different disks to form a reliability group for which parity may be added.

Disk storage system 300 comprises a fragment Set1 comprising data objects O1 (disk1), O2 and O3 (disk2), and O4 (disk4). Fragment Set1 comprises data objects (i.e., comprising two parity objects) associated with a normal importance level. One of the two parity objects is added to new disk4 and the other parity object is added immediately or in future on disk5 based on a specified requirement. Likewise, fragment Set2 comprises data objects O5 (disk2) and O6 (disk3) comprising high importance data. Fragment Set2 comprises three parity objects such that one parity object is stored on new disk4 and the other two parity objects will be added immediately or in future on disk5 and disk6 based on a specified requirement. An implementation example is described as follows:

A user storing 10 TB of data residing on a backup storage system specifies that 100 GB of data (i.e., of the 10 TB of data) comprises important data requiring extra backup protection. The user marks 60 GB (of the 100 GB specified as important data) as normal importance data and 40 GB (of the 100 GB specified as important data) as high importance data. With respect to the 60 GB of normal importance data, the customer specifies no data loss after two disk drive failures. With respect to the 40 GB of high importance data, the customer specifies no data loss after three disk failures. The 60

GB of normal importance data is stored across 4 disks, with 15 GB data objects on each disk. An erasure code is enabled to compute 2 parity objects and place them on new allocated disks thereby meeting a customer requirement of surviving 2 disk failures with use of 30 GB of additional disk space. Additionally, 4 data objects are generated with the 2 parity objects, thereby generating an erasure encoding rate of 4/6=0.66%. The 40 GB of high importance data is stored across 5 disks, with 8 GB data objects on each disk. An erasure code is enabled to compute 3 parity objects and place them on new allocated disks thereby meeting a customer requirement of surviving 3 disk failures with 24 GB of additional space. Additionally, 5 data objects are generated with the 3 parity objects thereby generating of erasure encoding rate of 5/8=0.62%.

The aforementioned implementation example may be further expanded to include an algorithm for grouping data objects, forming data fragments, and forming fragment groups to achieve replica space optimization for variable size data objects spread across multiple disks. The algorithm is described as follows:

1. A user generates a list of important data objects currently stored on a backup/archival storage system. For each important data object, an importance level is assigned.
2. Based on a health of a storage device currently storing an associated data, an urgency level for creating a reliability factor is determined.
3. Data objects are grouped based on an importance level and a health of an associated storage device.
4. For each data object group (based on the importance levels), a required level of reliability is determined. This required level of reliability is used to determine a required erasure encoding rate for the data objects. A required erasure encoding rate comprises a percentage ratio of a number of data disks divided by a total number of disks (i.e., data+parity).
5. In each data object group, a fragment set is generated such that each fragment comprises single/multiple objects belonging to a same disk. Fragments of almost equal size are grouped into a fragment set such that each fragment in a fragment set belongs to a different disk. An erasure encoding rate of an associated group is assigned to the fragment set.
6. Based on a size of a fragment set and required erasure encoding rate, a number of additional parity objects required for given fragment set is determined. A fragment set may be divided if a number of additional parity objects falls beyond considerable amount.
7. An erasure code algorithm is applied to compute given parity objects. Based on an urgency level, parity objects are placed on new disks in lazy manner (when the user allocates a new disk for latest backup data) or immediately to allocate new disks to store parity objects. Parity objects may be computed on-demand when new disks are available.

In order to implement the aforementioned algorithm, the following tables 1-4 must be generated and maintained.

Table 1 below (i.e., an important data object information table) is generated by scanning data information and identifying a list of files or portions of files comprising importance and requiring reliability. For each important data portion, a user determines: a start block, a size, a disk name, a health of a disk, and an importance level of a data portion. Each important data portion is assigned unique object ID. A health of disk is determined using disk self-monitoring, analysis and reporting technology (SMART) parameters.

TABLE 1

| ObjectNo | StartBlock | Size | Importance 0(min)-5(max) | Disk | HealthofDisk 0(min)-5(max) |
|---|---|---|---|---|---|
| O1 | 100 | 500 | 2 | 1 | 4 |
| O2 | 200 | 200 | 2 | 2 | 4 |
| O3 | 700 | 300 | 2 | 2 | 4 |
| O4 | 200 | 500 | 2 | 3 | 4 |
| O5 | 600 | 300 | 4 | 2 | 3 |
| O6 | 700 | 300 | 4 | 3 | 3 |

Table 2 below (i.e., a group information table) comprises group information. Based on a combination of importance and health, groups are defined. For each group, a user defines a required erasure encoding rate and urgency level. A required erasure encoding rate comprises a ratio of a number of data disks divided by total number of data disks (data+parity).

TABLE 2

| Group | Importance | HealthOfDisk | Required Erasure Encoding Rate (%) less is good | Urgency 0 min - 5 max |
|---|---|---|---|---|
| 1 | 5 | 5 | 50% | 0 |
| 2 | 5 | 4 | 50% | 1 |
| 3 | 5 | 3 | 50% | 2 |
| 4 | 4 | 5 | 70% | 0 |
| 5 | 4 | 4 | 70% | 1 |
| 6 | 4 | 3 | 70% | 2 |

Table 3 below (i.e., an object group information table) comprises information associated with objects in a group. For each object from table 1, an associated group is determined (with respect to table 2) and entries are added in table 3.

TABLE 3

| Group | Object | Size | Disk | Mark |
|---|---|---|---|---|
| 1 | O1 | 500 | 1 | 0 |
| 1 | O2 | 200 | 2 | 0 |
| 1 | O3 | 300 | 2 | 0 |
| 1 | O4 | 500 | 3 | 0 |
| 2 | O5 | 300 | 2 | 0 |
| 2 | O6 | 300 | 3 | 0 |

Table 4 below comprises a fragment set table.

TABLE 4

| SetNo | ListOfObjects | SetSize | Number of Additional Parity Objects | Urgency | Parity Allocated Disks | Number of Pending Parity Objects |
|---|---|---|---|---|---|---|
| 1 | O1, O2-O3, O4 | 3 | 2 | 3 | Disk4 | 1 |
| 2 | O5, O6 | 2 | 3 | 3 | Disk4 | 2 |

The following formula enables a calculation for determining a number of additional parity disks.

$$A = S*(100-R)/R, \text{ where } S=\text{fragment size}, R=\text{erasure encoding rate}, A=\text{number of additional parity disks.} \quad \text{Formula 1}$$

Generating fragment sets comprises the following process: For each group GroupX from Table 3:
1. Let Dsk-ListX comprise a list of distinct disks where objects from GroupX are stored.

2. Locate object-y comprised by of GroupX, unmarked and comprising a maximum size as SZ-MAX. Let disk-y comprise a corresponding disk.
3. Generate an empty fragment set FragSetY. Add an object-Y to the fragment set FragSetY.
4. For each disk-z from Dsk-ListX (independent from disk-y)
   A. Determine if an object-z from disk-z and GroupX that comprises a size similar to SZ-MAX exists.
   B. If object-z is located, add object-z to the FragSetY and mark the object-z entry in Table 2. If object-z is not located, determine if there are two or more objects from disk-z and GroupX comprising a sum close to SZ-MAX. Add located objects to the FragSetY. Notate object entries in Table 2.
5. Determine if a size of FragSetY is greater than 2.
   A. If a size of FragSetY is greater than 2, add fragment set FragSetY to Table 3 and execute formula 1 to determine a number of additional parity objects required for this set. Update table 3 accordingly.
   B. If a size of FragSetY is not greater than 2, split object-y into two equal sized objects; object-y1 and object-y2. Remove an object-y entry from Table 2 and add object-y1, object-y2 to table 2 in GroupX.

Figure 4:
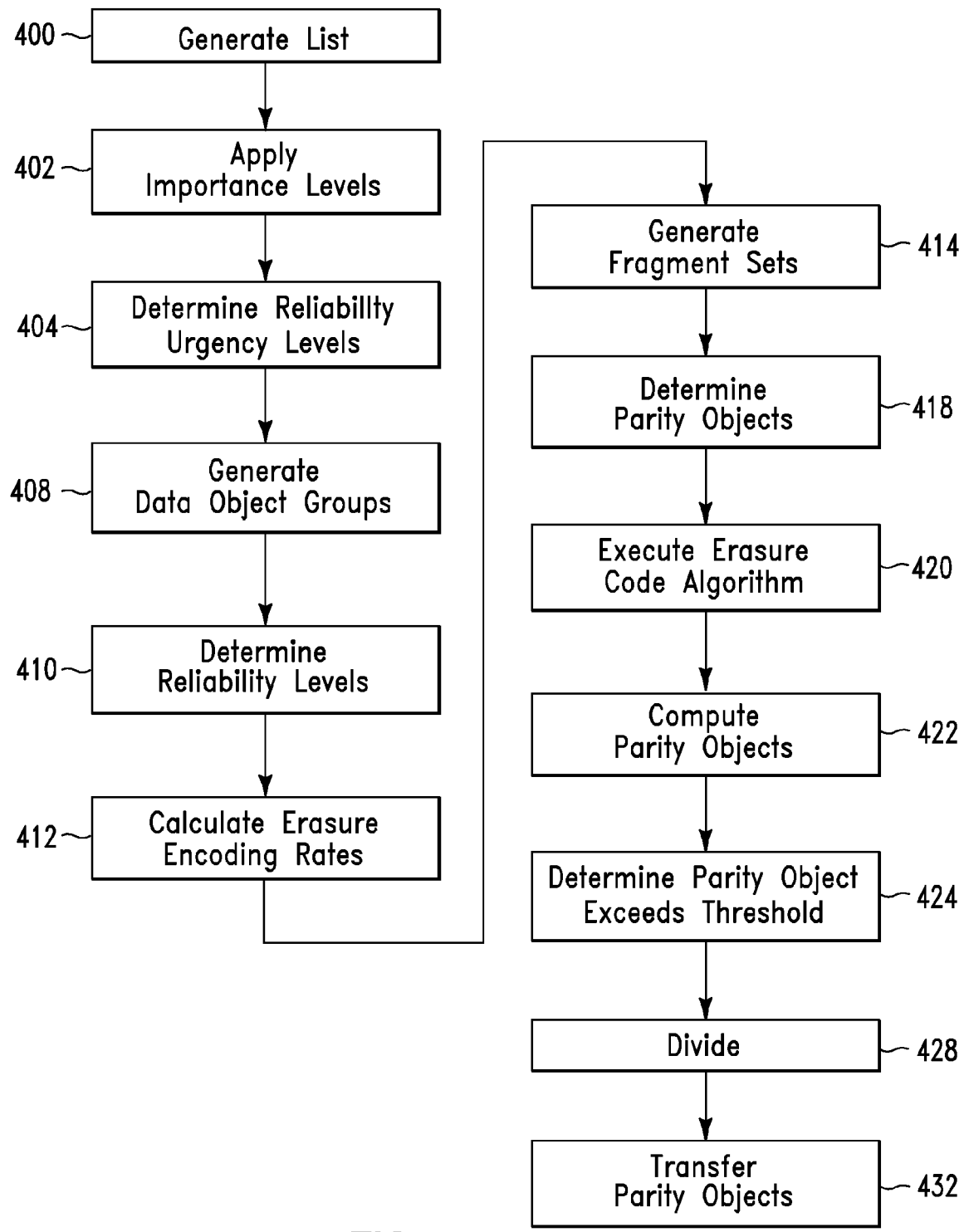
FIG. 4 illustrates an algorithm detailing a process flow enabled by the disk storage system of FIG. 3 for providing a means for improving reliability of important data already stored on a backup/archive storage system.

FIG. 4 illustrates an algorithm detailing a process flow enabled by disk storage system 300 Of FIG. 3 for providing a means for improving reliability of important data already stored on a backup/archive storage system. Each of the steps in the algorithm of FIG. 4 may be enabled and executed in any order by a computer processor executing computer code. In step 400, a list defining specified data objects of multiple data objects stored within a back-up/archived data storage system is generated based on user defined data. In step 402, importance levels are applied to the specified data objects. In step 404, reliability urgency levels are determined (based on determined health factors) for storage devices storing the specified data objects. In step 408, data object groups are generated based on the importance levels and determined health factors. In step 410, required reliability levels for each group of data objects are determined based on the importance levels. In step 412, erasure encoding rates for the groups of data objects are calculated based on the importance levels. In step 414, fragment sets for the groups of data objects are generated. In step 418, numbers of parity objects required for the fragment sets are determined based on the erasure encoding rates and a size of each fragment set. In step 420, an erasure code algorithm is executed with respect to the groups of data objects. In step 422, parity objects of the groups of data objects are computed on demand based on results of step 420. In step 424, it is determined that a number of parity objects exceeds a specified threshold. In step 428, an associated fragment set is divided into multiple fragment sets. In step 432, specified parity objects are transferred (based on reliability urgency levels) from a first data storage device of the back-up/archived data storage system to a second data storage device of the back-up/archived data storage system.

Figure 5:
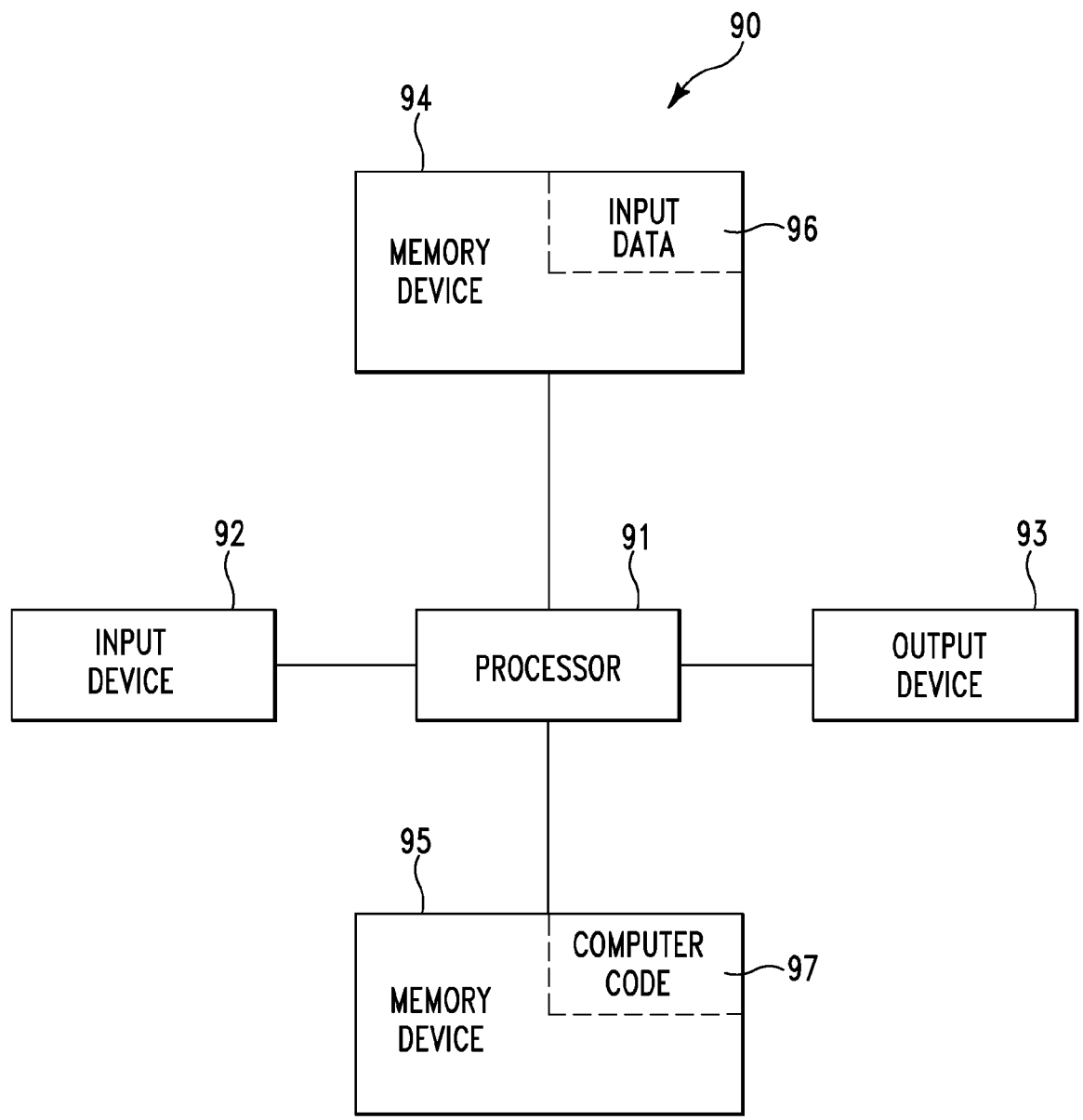
FIG. 5 illustrates a computer apparatus for providing a means for improving reliability of important data already stored on a backup/archive storage system, in accordance with embodiments of the present invention.

FIG. 5 illustrates a computer apparatus 90 (e.g., disk storage system 300 of FIG. 3) for providing a means for improving reliability of important data already stored on a backup/archive storage system, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for providing a means for improving reliability of important data already stored on a backup/archive storage system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to provide a means for improving reliability of important data already stored on a backup/archive storage system. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for providing a means for improving reliability of important data already stored on a backup/archive storage system. In another embodiment, the invention provides a business method that performs the process steps of the invention on a subscription, advertising, and/or fee basis. That is, a service supplier, such as a Solution Integrator, could offer to provide a means for improving reliability of important data already stored on a backup/archive storage system. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A priority based method comprising:
   generating, by a computer processor of a computing system based on user defined data, a list defining specified data objects of multiple data objects stored within a back-up/archived data storage system;
applying, by said computer processor, importance levels to said specified data objects;
determining, by said computer processor based on determined health factors for storage devices storing said specified data objects, reliability urgency levels for said storage devices;
generating, by said computer processor based on said importance levels and determined health factors, groups of data objects of said specified data objects;
determining, by said computer processor based on said importance levels, required reliability levels for each group of said groups of data objects;
calculating, by said computer processor based on said importance levels, erasure encoding rates for said groups of data objects;
generating, by said computer processor, fragment sets for said groups of data objects;
determining, by said computer processor based on said erasure encoding rates and a size of each said fragment set, numbers of parity objects required for said fragment sets;
executing, by said computer processor, an erasure code algorithm with respect to said groups of data objects; and
computing on demand, by said computer processor based on results of said executing, parity objects of said groups of data objects.

2. The method of claim 1, wherein said calculating said erasure encoding rates comprises dividing a percentage ratio of data storage devices of said back-up/archived data storage system by a total number of data storage devices.

3. The method of claim 1, wherein each fragment of said fragment sets comprises data objects of said specified data objects belonging to a same storage device of said back-up/archived data storage system.

4. The method of claim 1, wherein a group of fragments of said fragment sets comprising an approximately equal size are placed in an associated fragment set such that each fragment of said group of fragments is associated with a different storage device of said back-up/archived data storage system.

5. The method of claim 1, further comprising:
determining, by said computer processor, that a number of parity objects exceeds a specified threshold; and
dividing, by said computer processor, an associated fragment set of said fragment sets into multiple fragment sets.

6. The method of claim 1, further comprising:
transferring, by said computer processor based on reliability urgency levels, specified parity objects of said parity objects to from a first data storage device of said back-up/archived data storage system to a second data storage device of said back-up/archived data storage system.

7. The method of claim 1, further comprising:
allocating, by said computer processor based on reliability urgency levels, specified parity objects of said parity objects to a new data storage device of said back-up/archived data storage system.

8. The method of claim 1, further comprising:
providing at least one support service for at least one of creating, integrating, hosting, maintaining, and deploying computer-readable code in the computing system, said code being executed by the computer processor to implement said generating said list, said applying, said determining said reliability urgency levels, said generating said groups of data objects, said determining said required reliability levels, said calculating, said generating said fragment sets, said determining said numbers of parity objects, said executing, and said computing on demand.

9. A computing system comprising a computer processor coupled to a computer-readable memory unit, said memory unit comprising instructions that when executed by the computer processor implements a method comprising:
generating, by said computer processor based on user defined data, a list defining specified data objects of multiple data objects stored within a back-up/archived data storage system;
applying, by said computer processor, importance levels to said specified data objects;
determining, by said computer processor based on determined health factors for storage devices storing said specified data objects, reliability urgency levels for said storage devices;
generating, by said computer processor based on said importance levels and determined health factors, groups of data objects of said specified data objects;
determining, by said computer processor based on said importance levels, required reliability levels for each group of said groups of data objects;
calculating, by said computer processor based on said importance levels, erasure encoding rates for said groups of data objects;
generating, by said computer processor, fragment sets for said groups of data objects;
determining, by said computer processor based on said erasure encoding rates and a size of each said fragment set, numbers of parity objects required for said fragment sets;
executing, by said computer processor, an erasure code algorithm with respect to said groups of data objects; and
computing on demand, by said computer processor based on results of said executing, parity objects of said groups of data objects.

10. The computing system of claim 9, wherein said calculating said erasure encoding rates comprises dividing a percentage ratio of data storage devices of said back-up/archived data storage system by a total number of data storage devices.

11. The computing system of claim 9, wherein each fragment of said fragment sets comprises data objects of said specified data objects belonging to a same storage device of said back-up/archived data storage system.

12. The computing system of claim 9, wherein a group of fragments of said fragment sets comprising an approximately equal size are placed in an associated fragment set such that each fragment of said group of fragments is associated with a different storage device of said back-up/archived data storage system.

13. The computing system of claim 9, wherein said method further comprises:
determining, by said computer processor, that a number of parity objects exceeds a specified threshold; and
dividing, by said computer processor, an associated fragment set of said fragment sets into multiple fragment sets.

14. The computing system of claim 9, wherein said method further comprises:
transferring, by said computer processor based on reliability urgency levels, specified parity objects of said parity objects to from a first data storage device of said back-up/archived data storage system to a second data storage device of said back-up/archived data storage system.

15. The computing system of claim 9, wherein said method further comprises:
allocating, by said computer processor based on reliability urgency levels, specified parity objects of said parity objects to a new data storage device of said back-up/archived data storage system.

16. A computer program product for prioritization, the computer program product comprising:
one or more computer-readable, tangible hardware storage devices;
program instructions, stored on at least one of the one or more storage devices, to generate based on user defined data, a list defining specified data objects of multiple data objects stored within a back-up/archived data storage system;
program instructions, stored on at least one of the one or more storage devices, to apply importance levels to said specified data objects;
program instructions, stored on at least one of the one or more storage devices, to determine based on determined health factors for storage devices storing said specified data objects, reliability urgency levels for said storage devices;
program instructions, stored on at least one of the one or more storage devices, to generate based on said importance levels and determined health factors, groups of data objects of said specified data objects;
program instructions, stored on at least one of the one or more storage devices, to determine based on said importance levels, required reliability levels for each group of said groups of data objects;
program instructions, stored on at least one of the one or more storage devices, to calculate based on said importance levels, erasure encoding rates for said groups of data objects;
program instructions, stored on at least one of the one or more storage devices, to generate fragment sets for said groups of data objects;
program instructions, stored on at least one of the one or more storage devices, to determine based on said erasure encoding rates and a size of each said fragment set, numbers of parity objects required for said fragment sets;
program instructions, stored on at least one of the one or more storage devices, to execute an erasure code algorithm with respect to said groups of data objects; and
program instructions, stored on at least one of the one or more storage devices, to compute on demand based on results of executing the erasure code algorithm, parity objects of said groups of data objects.

17. The computer program product of claim 16, wherein calculating said erasure encoding rates comprises dividing a percentage ratio of data storage devices of said back-up/archived data storage system by a total number of data storage devices.

18. The computer program product of claim 16, wherein each fragment of said fragment sets comprises data objects of said specified data objects belonging to a same storage device of said back-up/archived data storage system.

19. The computer program product of claim 16, wherein a group of fragments of said fragment sets comprising an approximately equal size are placed in an associated fragment set such that each fragment of said group of fragments is associated with a different storage device of said back-up/archived data storage system.

20. The computer program product of claim 16, further comprising:
program instructions, stored on at least one of the one or more storage devices, to determine that a number of parity objects exceeds a specified threshold; and
program instructions, stored on at least one of the one or more storage devices, to divide an associated fragment set of said fragment sets into multiple fragment sets.

* * * * *